(12) United States Patent
Heibel

(10) Patent No.: US 9,640,290 B2
(45) Date of Patent: May 2, 2017

(54) SOLID STATE ELECTRICAL GENERATOR

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 637 days.

(21) Appl. No.: 14/159,653

(22) Filed: Jan. 21, 2014

(65) Prior Publication Data

US 2015/0206612 A1 Jul. 23, 2015

(51) Int. Cl.
*G21H 1/04* (2006.01)
*G21C 9/00* (2006.01)
*G21C 19/07* (2006.01)
*G21D 3/04* (2006.01)

(52) U.S. Cl.
CPC ............. *G21H 1/04* (2013.01); *G21C 9/00* (2013.01); *G21C 19/07* (2013.01); *G21D 3/04* (2013.01); *Y02E 30/40* (2013.01)

(58) Field of Classification Search
CPC . G21H 1/04; G21C 9/00; G21C 19/07; G21C 1/00; G21D 3/04
USPC .......................................... 376/320; 136/202
See application file for complete search history.

(56) References Cited

U.S. PATENT DOCUMENTS

| | | | | |
|---|---|---|---|---|
| 2,847,585 A * | 8/1958 | Christian | ................ | G21H 1/06 376/320 |
| 2,858,459 A * | 10/1958 | Schwarz | ................ | G21H 1/04 250/515.1 |
| 3,591,860 A * | 7/1971 | Sampson | ................ | G21H 1/04 376/320 |
| 3,742,366 A * | 6/1973 | France | ................ | G21G 4/04 376/158 |
| 5,084,909 A * | 1/1992 | Pollak | ................ | B01J 19/082 250/492.1 |
| 5,721,462 A * | 2/1998 | Shanks | ................ | G21H 1/12 136/253 |

(Continued)

FOREIGN PATENT DOCUMENTS

| CN | 202939986 U | 5/2013 |
|---|---|---|
| JP | 2000221297 A | 8/2000 |

OTHER PUBLICATIONS

International Search Report and Written Opinion of the International Searching Authority for PCT/US2014/066734 dated Mar. 25, 2015 (Forms PCT/ISA/220, PCT/ISA/210, PCT/ISA/237).

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A solid state electrical generator that is responsive to a relatively low level radiation field to power emergency equipment in a nuclear powered generating facility. The electricity is generated from materials, that are not initially radioactive, that are able to produce electrical power when placed inside a relatively low neutron and/or gamma radiation field and will essentially breed material to enhance the power produced by the device sufficiently to allow the device to provide sufficient power to the emergency equipment, even though the reactor or other source of neutron and/or gamma radiation has shut down.

16 Claims, 5 Drawing Sheets

(56) References Cited

U.S. PATENT DOCUMENTS

| | | | | |
|---|---|---|---|---|
| 5,861,701 A | * | 1/1999 | Young | G21H 1/04 |
| | | | | 310/304 |
| 6,252,923 B1 | | 6/2001 | Iacovino et al. | |
| 8,653,715 B1 | * | 2/2014 | Baumbaugh | G21H 1/02 |
| | | | | 310/301 |
| 2013/0028365 A1 | | 1/2013 | Tatli et al. | |
| 2013/0083879 A1 | * | 4/2013 | Heibel | G21C 17/00 |
| | | | | 376/153 |
| 2015/0055742 A1 | * | 2/2015 | Heibel | G01T 3/008 |
| | | | | 376/254 |

* cited by examiner

SOLID STATE ELECTRICAL GENERATOR

BACKGROUND

1. Field

This invention pertains generally to electrical generators and more particularly to a solid state assembly that generates electricity in response to a relatively low radiation environment.

2. Related Art

Events in Japan's Fukushima Dai-ichi Nuclear Power Plant reinforced concerns of the possible consequences of a loss of power over an extended period to the systems that cool the nuclear reactor core and spent fuel pools. As the result of a tsunami there was a loss of off-site power which resulted in station blackout periods. The loss of power shut down the reactor and spent fuel pool cooling systems. The water in some of the spent fuel pools dissipated through vaporization and evaporation due to a rise in the temperature of the pools heated by the highly radioactive spent fuel assemblies submerged therein. Without power, over an extended period, to pump replacement water into the reactor and into the spent fuel pools the fuel assemblies could potentially become uncovered, which could, theoretically, raise the temperature of the fuel rods in those assemblies, possibly leading to a breach in the cladding of those fuel rods and possible escape of radioactivity into the environment. The total loss of power for the equipment and sensors experienced by the Fukushima Dai-ichi units following the devastating tsunami resulted in an inability to control the valve functions needed to maintain fuel assembly cooling. It is an object of this invention to provide a device capable of passively providing the electrical current required to greatly extend the ability of the nuclear station batteries to control the core cooling and monitoring systems, enabling them to continue to perform the required critical functions during a station blackout.

SUMMARY

These and other objects are achieved by a solid state electrical generator having an electrically conductive housing with a radiation responsive material supported within the electrically conductive housing. The radiation responsive material is responsive to background radiation within a nuclear power generating facility, outside of the nuclear reactor, but within the vicinity of nuclear fuel rods, to generate sufficient electricity to operate or substantially fully charge batteries that operate emergency equipment within the facility. An insulator is situated between the radiation responsive material and the housing. In one embodiment, the electrical output of the radiation responsive material increases over a given period of time within a field of the background radiation. After a first given number of operating cycles of the nuclear reactor, the electricity produced by the radiation responsive material is sufficient to operate or substantially fully charge the batteries that operate the emergency equipment even with the reactor shut down.

Preferably, the radiation responsive material is not radioactive until it is placed within the background radiation. In addition, the electrically conductive housing can be thin enough to fit within a space between a wall of the reactor cavity within which the nuclear reactor is supported and the outside of the pressure vessel that houses the core of the nuclear reactor.

In one embodiment, the radiation responsive material is a gamma radiator substantially sandwiched against a gamma and electron radiator. In one such embodiment, the radiation responsive material is a combination of Co-59 and tungsten. Preferably, the electrically conductive housing and the radiation responsive material are flexible.

In still another embodiment, an electrical insulator seal gasket is supported between a backside of the housing and the gamma radiator and electrically insulates the backside of the housing from a front side of the housing which forms a collector. The invention also contemplates a nuclear power generating facility including such a solid state electrical generator.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
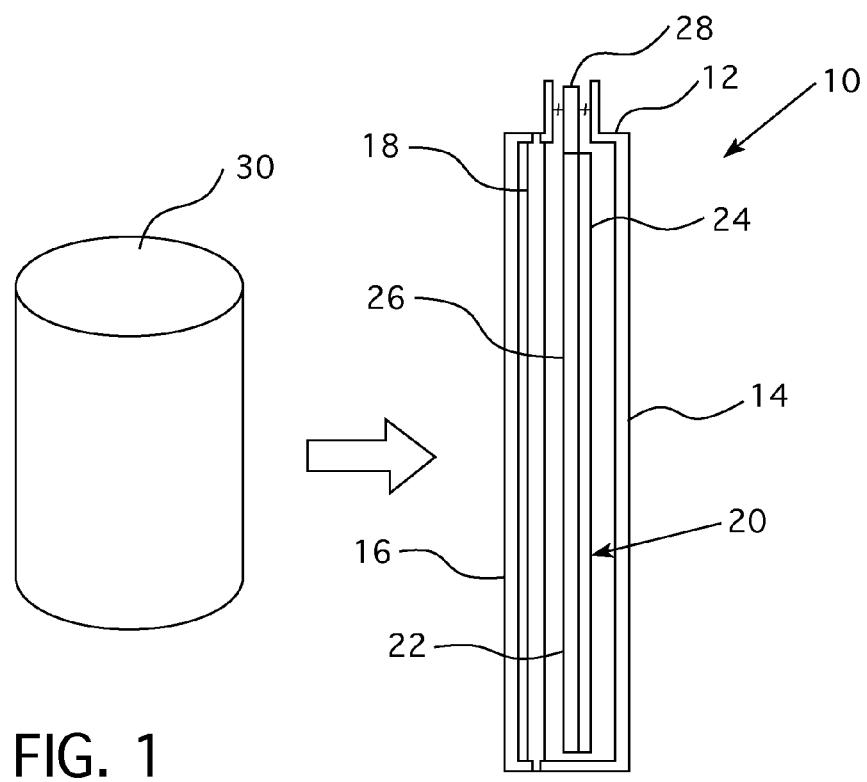
FIG. 1 is a schematic representation of a side view of one exemplary preferred embodiment of the principles claimed hereafter.
Figure 2:
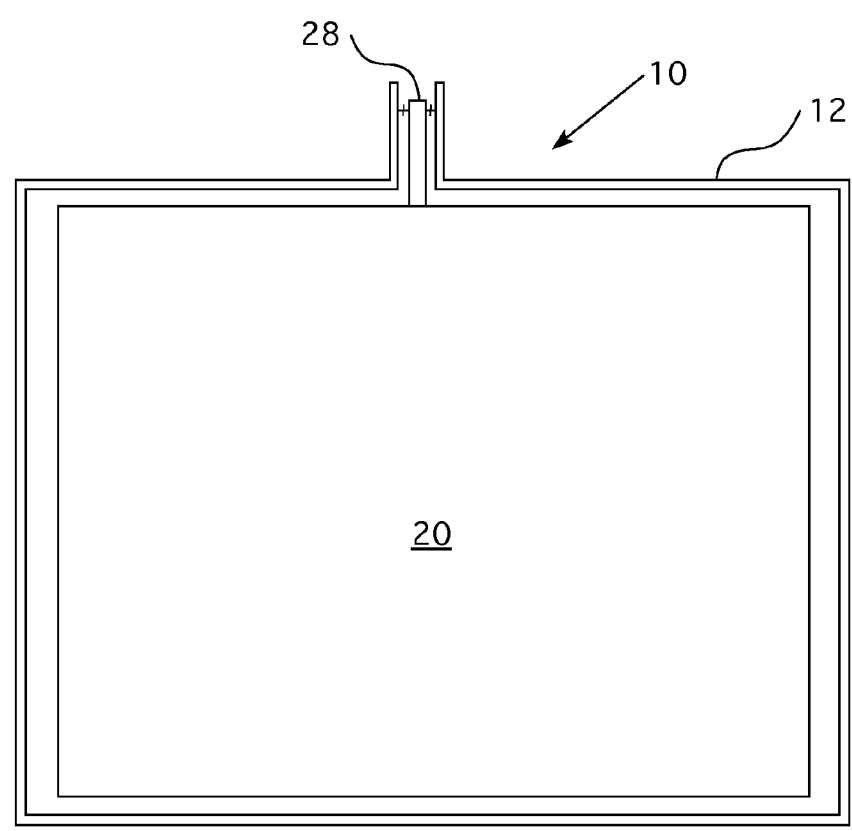
FIG. 2 is a front view of the embodiment illustrated in FIG. 1.

FIG. 1 shows a side view and FIG. 2 shows a front view of a schematic representation of one exemplary preferred embodiment of the principles claimed hereafter. The electrical current generator illustrated in FIGS. 1 and 2 is a solid state device having an outer housing 12 with an electrically conductive front end 14 which is sealed from a back end 16 by an insulator seal gasket base plate 18. A radiation responsive material 20 is disposed between the front end of the housing 14 and the insulator seal gasket face plate 18, with insulation 26, such as $Al_2O_2$ disposed on both sides of the radiation responsive material 20 between the radiation responsive material and the front of the housing 14 and between the radiation responsive material 20 and the insulator seal gasket face plate 18. The insulator seal gasket faceplate 18 keeps electrons being "pushed" into the device from the face nearest the external gamma radiation source (e.g., the reactor vessel) from canceling out the electrons generated by the internal gamma emitter.

The radiation responsive material 20, in this embodiment, is formed from a gamma radiator material, such as, for example, Co-59 that is substantially sandwiched against a gamma and electron radiator such as tungsten with an electrical lead 28 forming an emitter that conducts the electron path between the utilization device that is to be powered and the current generator 10. The front portion of the housing 14 forms the collector. The term "gamma radiator" is used to denote a material that emits gammas in response the decay or capture within the material of either neutrons or gamma as a result of incident radiation. Similarly, the term "gamma and electron radiator" is used to denote a material that emits electrons in response to the decay or capture within the material of gammas or neutrons.

Figure 3:
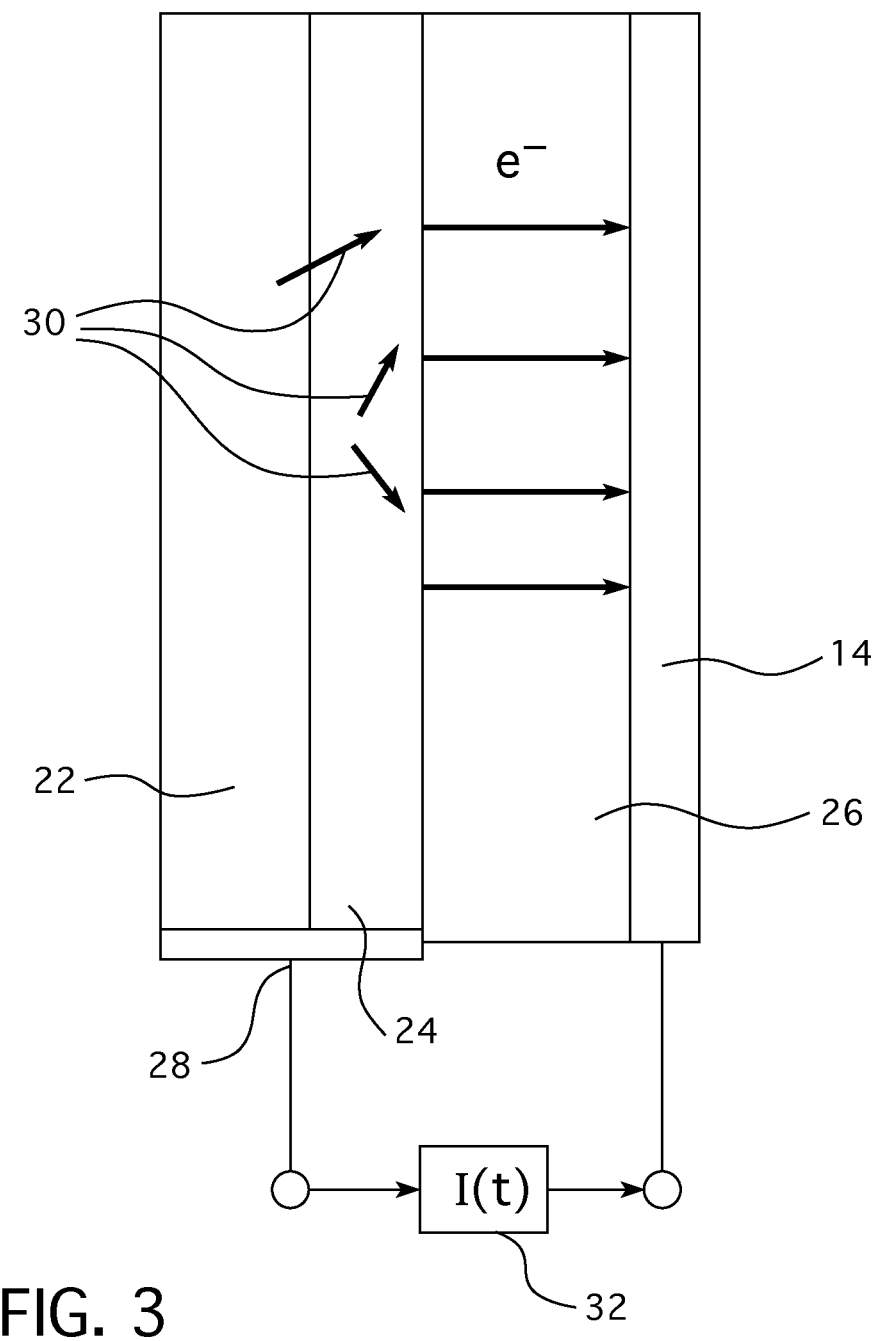
FIG. 3 is a schematic representation of the electrical current production mechanism of this invention.

FIG. 3 shows a schematic representation of the electrical current production mechanism of this exemplary embodiment of the invention claimed hereafter. When the device 10 is irradiated by a neutron and/or gamma source 30, some of the radiation decays and is captured within the radiation responsive material, which emits electrons that are collected by the front end of the aluminum housing 14, to establish an electrical current 32 which flows from the emitter 28 to the collector 14.

The surface area and thickness of the gamma radiator, (e.g., Co-60) and the corresponding surface area and desired thickness of the gamma and electron radiator, e.g., tungsten, may be adjusted by those skilled in the art to achieve the desired electrical current generation within the expected neutron and gamma radiation fields. The thickness of the insulation 26 between the radiator elements 20 and the outer collector 14 may also be optimized by those skilled in the art to produce the maximum current without suffering from shorting between the two regions within the expected operating temperature range of the device.

As FIG. 3 indicates, the primary source of electric current in this device is a function of time, I(t). Generated within the device are Compton and photo-electrically scattered electrons produced in the tungsten plate 24 adjacent to the cobalt-59 plate 22, by the gamma radiation produced by Co-60 generated by neutron interactions with Co-59 in the Co-59 plate. In addition to this mechanism for electric current production, the prompt capture gamma radiation released when a neutron is captured by a material such as tungsten will also produce Compton and photo-electrical scattered electrons that have sufficient energy to cross the gap between the radiator 20 and the collector 14. The surface area of the device can be made very large. The device can also be very thin and flexible.

Figure 4:
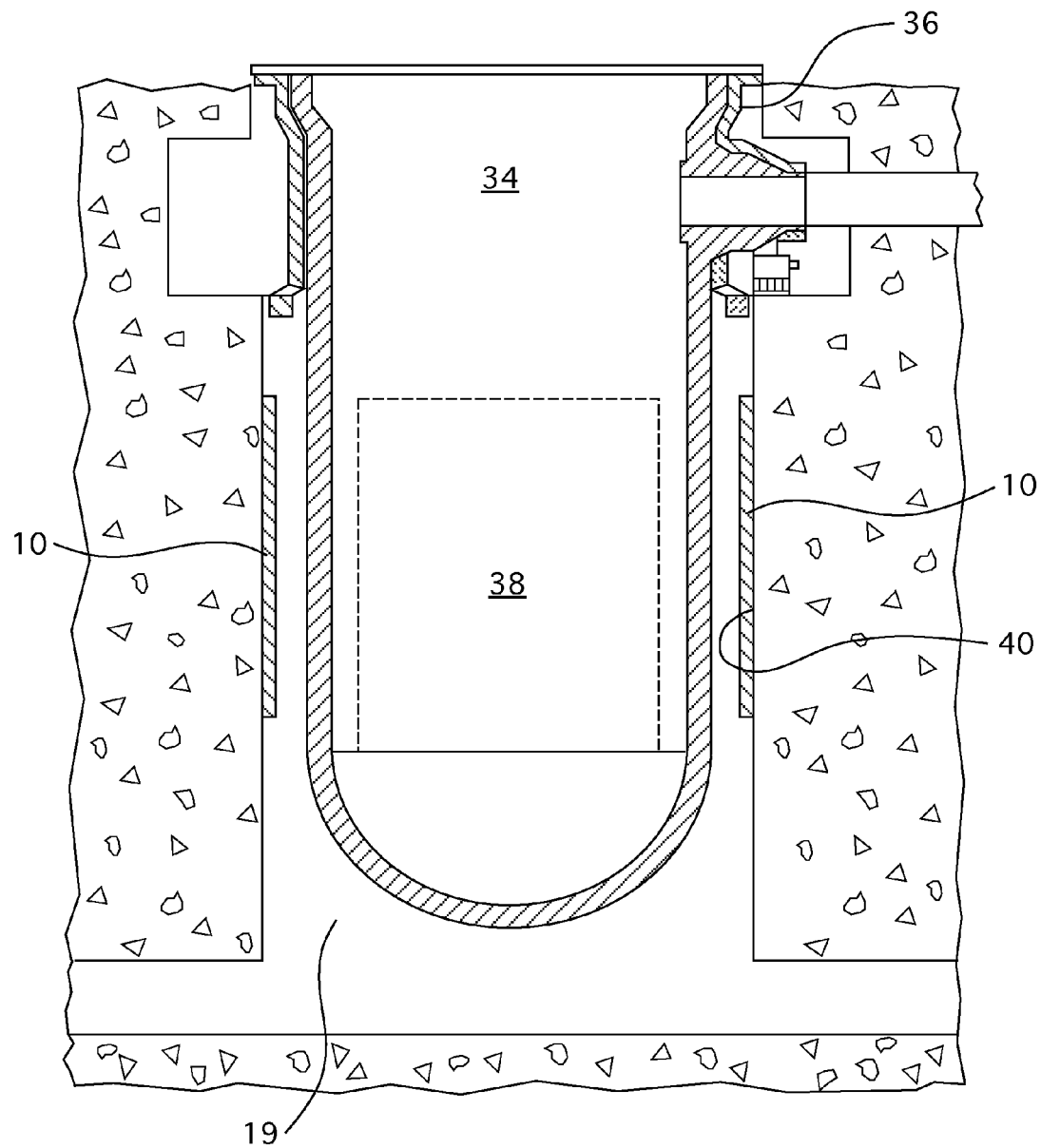
FIG. 4 is a cross sectional view of a reactor cavity with the electrical generator of this invention shown supported from the sidewalls thereof, between the reactor cavity wall and the reactor pressure vessel, extending at least partially there around.
Figure 5:
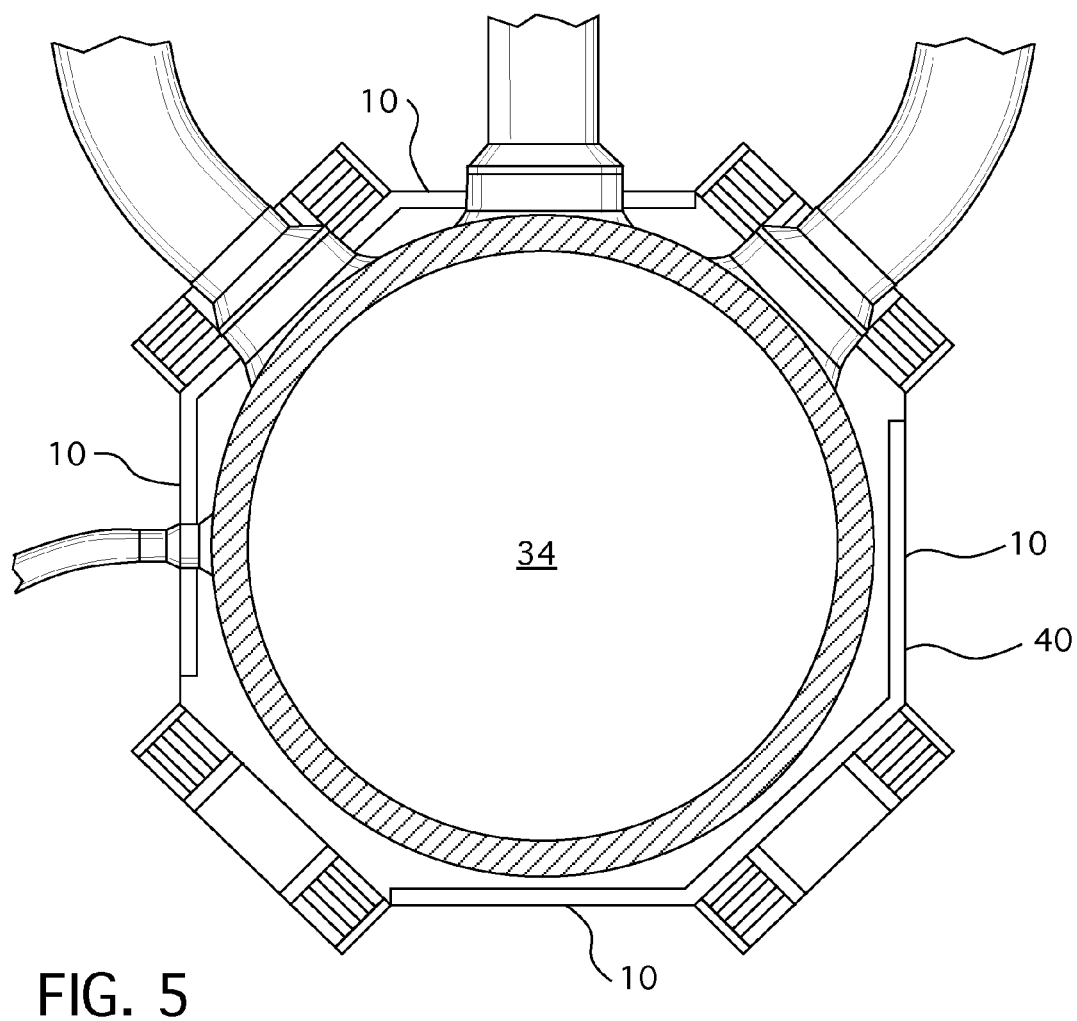
FIG. 5 is a plan sectional view of a portion of the reactor cavity shown in FIG. 4.

FIG. 4 shows an example of a potential application. A reactor vessel 34 is supported within the reactor cavity 36 and encloses a reactor core 38 housing the nuclear fuel assemblies. The cavity walls 40 extend around the vessel 34 over the height of the core 38 and the walls 40 support the device 10 of this invention over at least a portion of the height of the reactor core 38. Thus, the device can be used to line the reactor vessel cavity and utilize the wasted neutrons and gamma radiation that leaks out of the reactor vessel 34 to generate valuable electrical current. FIG. 5 shows a plan view of a cross section of the reactor cavity having the device 10 wrapped around at least a portion of the cavity walls 40.

Figure 6:
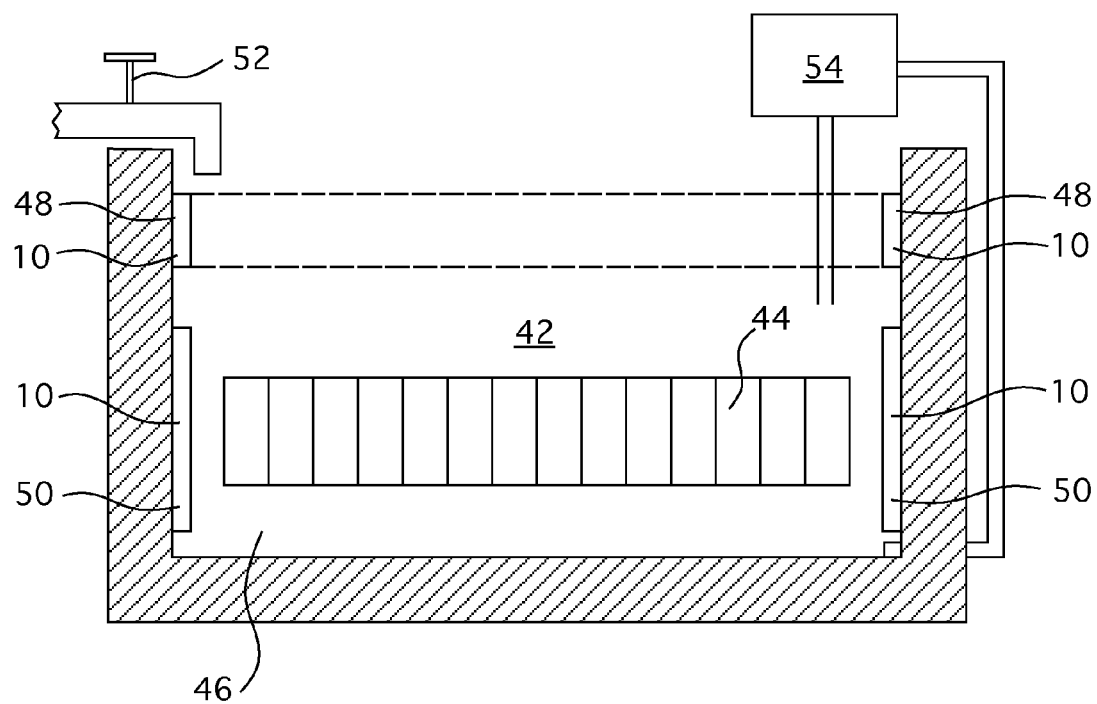
FIG. 6 is a cross sectional schematic view of a spent fuel pool.

FIG. 6 shows another potential application for this device to a spent fuel pool 42 having racks of spent fuel assemblies 44 suspended within a coolant 46. The device 10 can be supported by the pool walls below the coolant 46 water level as shown at location 50 or it may be suspended from the walls above the coolant level as indicated by the locations 48. Multiple devices 10 can be spread around the spent fuel pool 42 and connected in series or parallel as needed to meet the requirements of equipment that it is intended to power. The device 10 may be used, for example, to power valves 52 for replenishing coolant 46 that may have evaporated from the pool or a recirculation system 54 for removing heat from the coolant 46.

This operating principle can be achieved using materials other than cobalt and tungsten. An important feature of this design is the use of materials that are able to produce electrical power when placed inside a relatively low neutron and gamma radiation field and will essentially breed material to enhance the power produced by the device sufficiently to allow the device to provide sufficient power to the batteries that supply power to critical instrumentation and safety equipment, even though the reactor or other source of neutron and gamma radiation has shut down. Preferably, the device is not initially radioactive.

An estimate of the amount of electric current that may be generated from ex-vessel deployment of this device in a twelve foot by twelve foot, by 0.5 inch device for the AP1000 nuclear reactor system available from Westinghouse Electric Company LLC, can be generated from information on the nominal neutron flux and gamma radiation dose inside the vessel cavity, the Co-60 generation rate, the capture gamma production rate in tungsten and the available current production sensitivity of tungsten (Mirion IST). The results of this simple calculation indicate that the device will output at least a steady three Amps of current following reactor shutdown after one cycle of operation. This amount can easily be increased by a factor of ten with proper optimization of the thickness of the gamma radiator and the gamma and electron radiator. This amount increases linearly with time until a significant amount of the Co-59 is converted to Co-60. After two cycles of operation, the output current will be twice as much.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A solid state electrical generator comprising:
   an electrically conductive housing having a front section and a back section with an insulator seal gasket base plate disposed between the front section and the back section, with a front side of the front section forming a collector;
   a radiation responsive material comprising a gamma radiator substantially sandwiched against a gamma and electron radiator, supported within the front section of the electrically conductive housing, the radiation responsive material being responsive to background radiation within a nuclear power generating facility outside of a nuclear reactor, but close enough to irradiated nuclear fuel rods to generate sufficient electricity to operate or to substantially fully charge batteries that operate emergency equipment within the facility;
   an electrical insulation material situated between the radiation responsive material and the insulator seal gasket base plate and between the radiation responsive material and the front section of the housing; and
   an electrical lead connected to the radiation responsive material and configured to convey an electrical output of the sufficient electricity to the batteries or the emergency equipment.

2. The solid state electrical generator of claim 1 wherein the electrical output of the radiation responsive material increases over a given period of time within a field of the background radiation.

3. The solid state electrical generator of claim 1 wherein the radiation responsive material is configured to breed additional radiation responsive material when subjected to the background radiation.

4. The solid state electrical generator of claim 1 wherein the radiation responsive material is not radioactive until it is placed within the background radiation.

5. The solid state electrical generator of claim 1 wherein the housing is thin enough to fit in a space between a wall of a reactor cavity within which the nuclear reactor is supported and the outside of a pressure vessel that houses a core of the nuclear reactor.

6. The solid state electrical generator of claim 1 wherein the radiation responsive material is a combination of Co-59 and Tungsten sandwiched together.

7. The solid state electrical generator of claim 1 wherein the housing and the radiation responsive material are flexible.

8. A nuclear power generating facility including a solid state electrical generator comprising:
  an electrically conductive housing having a front section and a back section with an insulator seal gasket base plate disposed between the front section and the back section, with a front side of the front section forming a collector;
  a radiation responsive material comprising a gamma radiator substantially sandwiched against a gamma and electron radiator, supported within the front section of the electrically conductive housing, the radiation responsive material being responsive to background radiation within a nuclear power generating facility outside of a nuclear reactor, but close enough to irradiated nuclear fuel rods to generate sufficient electricity to operate or to substantially fully charge batteries that operate emergency equipment within the facility;
  an electrical insulation material situated between the radiation responsive material and the insulator seal gasket base plate and between the radiation responsive material and the front section of the housing; and
  an electrical lead connected to the radiation responsive material and configured to convey an electrical output of the sufficient electricity to the batteries or the emergency equipment.

9. The nuclear power generating facility of claim 8 wherein the electrical output of the radiation responsive material increases over a given period of time within a field of the background radiation.

10. The nuclear power generating facility of claim 8 wherein the radiation responsive material is configured to breed additional radiation responsive material when subjected to the background radiation.

11. The nuclear power generating facility of claim 8 wherein the radiation responsive material is not radioactive until it is placed within the background radiation.

12. The nuclear power generating facility of claim 8 wherein the housing is thin enough to fit in a space between a wall of a reactor cavity within which the nuclear reactor is supported and the outside of a pressure vessel that houses a core of the nuclear reactor.

13. The nuclear power generating facility of claim 8 wherein the radiation responsive material is a combination of Co-59 and Tungsten sandwiched together.

14. The nuclear power generating facility of claim 8 wherein the housing and the radiation responsive material are flexible.

15. The nuclear power generating facility of claim 8 including:
  a reactor pressure vessel supported within a reactor cavity having walls that surround at least a lower portion of the pressure vessel;
  wherein the housing is at least partially supported within the reactor cavity between the pressure vessel and the walls.

16. The nuclear power generating facility of claim 8 including a spent fuel pool having walls that surround spent fuel wherein the housing is supported adjacent spent fuel in the spent fuel pool.

* * * * *